No. 12,278. REISSUED OCT. 25, 1904.

A. BRAMBACH.

PIANO TUNER.

APPLICATION FILED JUNE 30, 1904.

2 SHEETS—SHEET 1.

Witnesses.

G. A. Paulbeschmitt

L. S. Atter

Inventor.

Aloys Brambach

By

Fred H. Rowsock

Atty.

PHOTO LITHOGRAPHED AT SACHETT & WILHELMS LITHO. & MFG. CO. NEW YORK.

No. 12,278. REISSUED OCT. 25, 1904.

A. BRAMBACH.

PIANO TUNER.

APPLICATION FILED JUNE 30, 1904.

2 SHEETS—SHEET 2.

Witnesses

G. A. Raubeschmitt

L. S. Alter

Inventor

Aloys Brambach

By

Fred H. Bowersock

Atty.

No. 12,278. Reissued October 25, 1904.

UNITED STATES PATENT OFFICE.

ALOYS BRAMBACH, OF NEW YORK, N. Y., ASSIGNOR TO ROBERT H. LANYON, OF CHICAGO, ILLINOIS.

PIANO-TUNER.

SPECIFICATION forming part of Reissued Letters Patent No. 12,278, dated October 25, 1904.

Original No. 718,691, dated January 20, 1903. Application for reissue filed June 30, 1904. Serial No. 214,808.

*To all whom it may concern:*

Be it known that I, ALOYS BRAMBACH, a subject of the King of Great Britain, residing in New York, borough of Bronx, and State of New York, have invented certain new and useful Improvements in Piano-Tuners, of which the following is a specification.

This invention relates to an improved device for tuning pianos and other keyed musical instruments on the principle of the so-called "equal temperament;" and the object of the invention is to furnish an instrument by which the art of tuning pianos—that is to say, the laying on of an even temperament in a piano—is greatly facilitated and not dependent on years of experience and a practiced ear.

With the above and other objects in view the invention consists generally in a suitable frame adjustable along the keyboard of a musical instrument carrying a single mechanism for producing a musical tone and simultaneously depressing the corresponding key in said keyboard and means for varying the pitch of said tone; and my invention further consists in various details of construction and combinations of parts, all as hereinafter more fully described, and particularly pointed out in the claims.

My invention will be more readily understood by reference to the accompanying drawings, forming a part of this specification, in which—

Figure 1:
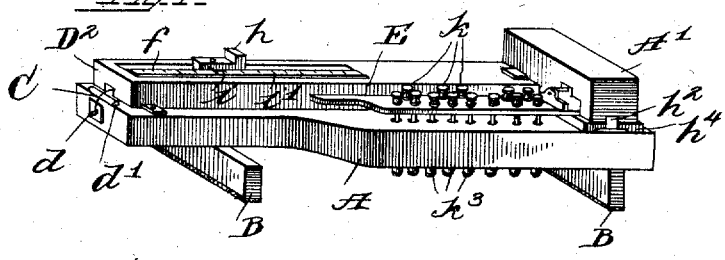
Figure 2:
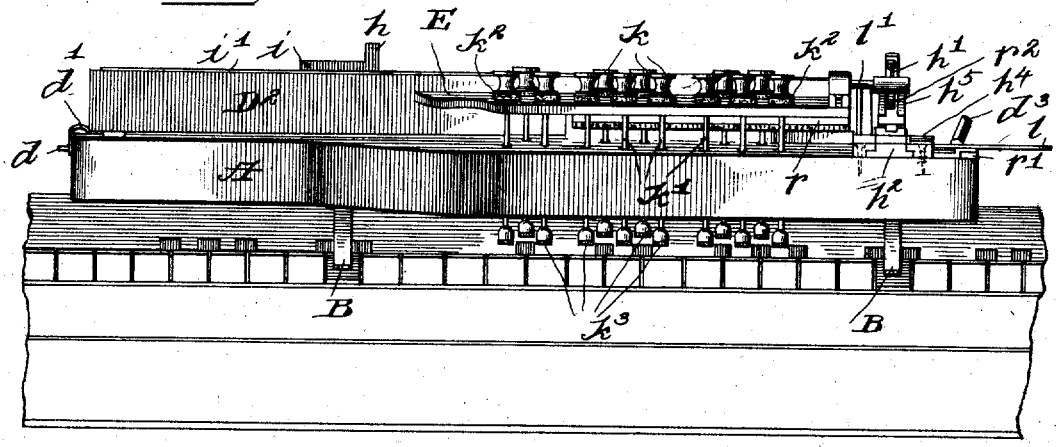
Figure 3:
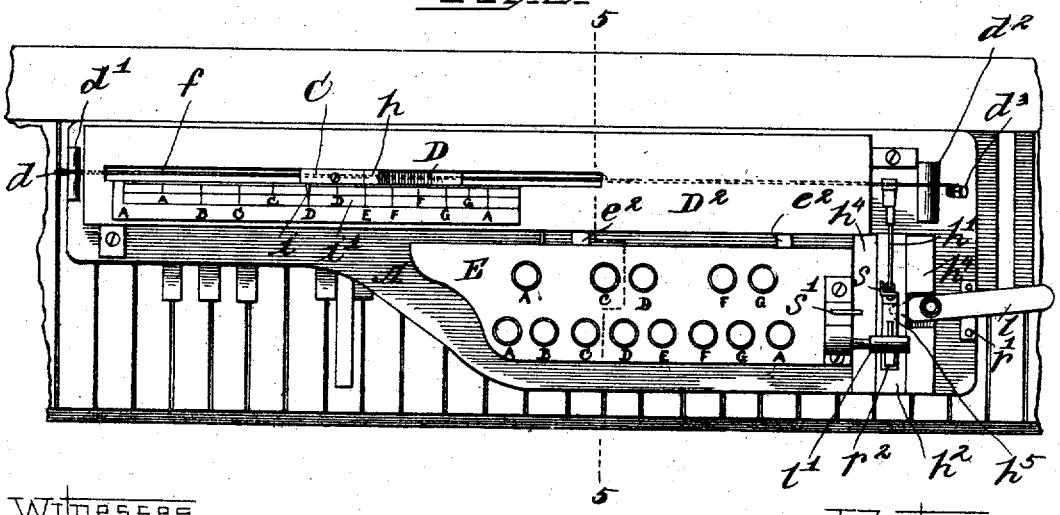
Figure 4:
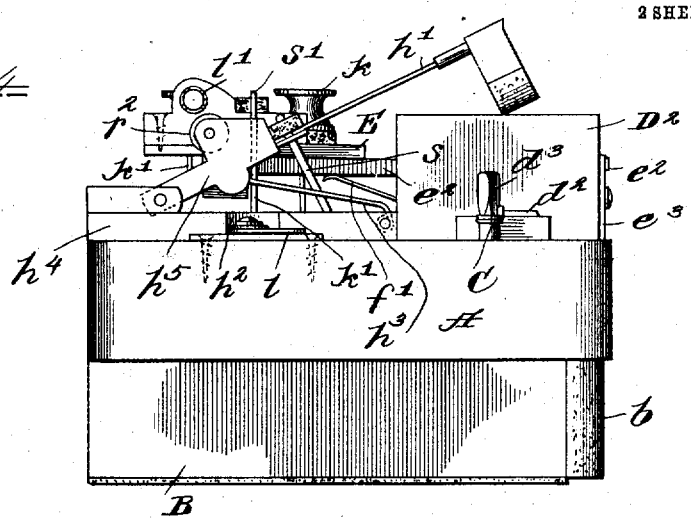
Figure 5:
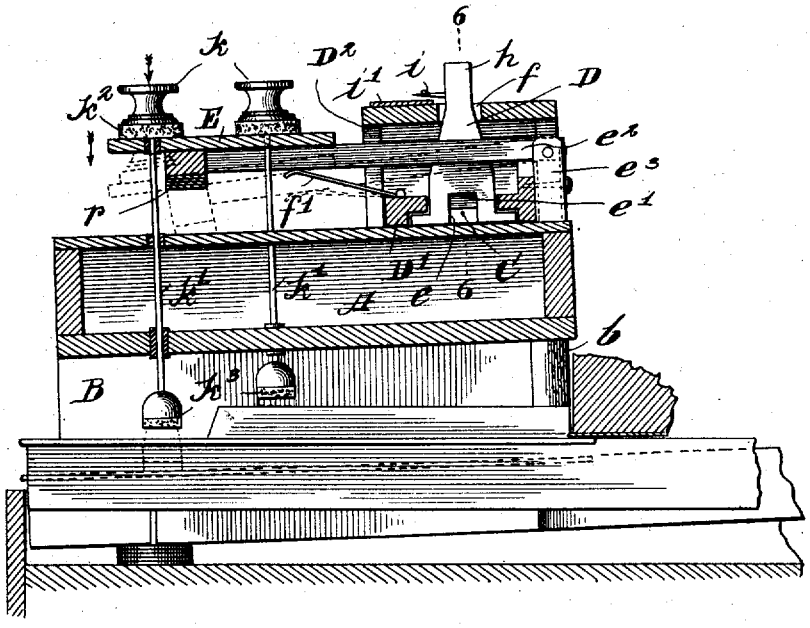
Figure 6:
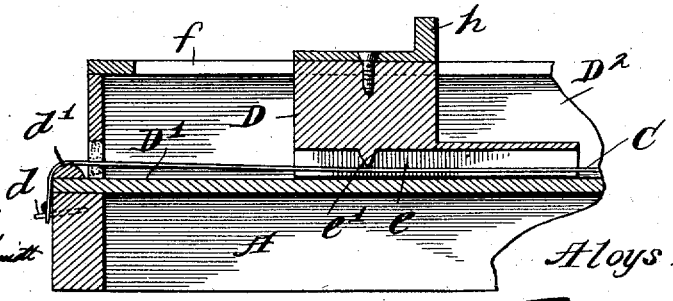

Figure 1 is a perspective view of my improved tuner. Fig. 2 is a front view of the tuner, showing it in position on the keyboard of the piano. Fig. 3 is a top view of Fig. 2. Fig. 4 is an end elevation of the same. Fig. 5 is a vertical transverse section on line 5 5, Fig. 3, Figs. 4 and 5 being drawn on a larger scale; and Fig. 6 is a vertical transverse section on line 6 6, Fig. 5, also drawn on a larger scale.

Referring now to the drawings in detail, A represents a sounding-board, which is made long enough to arrange one of the treble strings of a piano on the same. The sounding-board is made of the usual approved construction, being approximately rectangular in shape, with one end somewhat narrower than the body, as shown in Figs. 1 and 3. The sounding-board A is supported on transverse bridge-pieces B, which are provided with cushioning-felts at their bottom surfaces that rest upon the piano-keys and with rounded-off felt or leather covered rear ends $b$, that abut against the front of the piano above the keys. At the rear part of the sounding-board is mounted a string C, which corresponds in length to one of the treble strings of a piano or other musical instrument. The string C is attached to a straining-pin $d$ at the left-hand end of the sounding-board, passed over agraffes $d'$ $d^2$ on the sounding-board, and attached to a tuning-pin $d^3$ at the opposite end of the sounding-board, as shown clearly in Fig. 3. A sliding metallic stop D is guided in ways D′ on the sounding-board, the stop being tapered in upward direction at the upper part and provided with an indicating-pin $i$ and a finger-piece $h$. The indicating-pin moves over a graduated scale $i'$, that is attached to the top of the casing $D^2$, which incloses the movable bridge. The finger-piece $h$ projects through a slot $f$ of the casing D, by means of which the stop can be readily moved. The scale $i'$ corresponds to an octave of the treble on the piano from A to A and the sharps of the same. The stop D is provided at its lower part with a longitudinal recess $e$, so as to permit the free vibration of the same, and in the longitudinal recess or groove $e$ with a transverse knife-edged tooth $e'$, which, in connection with the weight of the bridge, bears on the string and produces thereby a sound corresponding to the length of the string. The casing $D^2$ is attached in any suitable manner to the sounding-board A. On the wider right-hand end of the sounding-board A is mounted a yielding keyboard E, which is pivoted by two rearwardly-extending arms $e^2$ to two uprights $e^3$, said keyboard being acted on at the under side by a spring $f'$, so as to be held in raised position, said spring being attached at one end to one of the guideways of the sliding stop D, the front end of the spring being attached to the under side of the keyboard. By pressing the keyboard in downward direction it will return to its normally horizontal position under action of the spring $f'$. The keyboard is provided with a number of keys $k$, the stems $k'$ of which pass through holes in the keyboard E and sounding-board A. The keys are cushioned on the under side by small felt disks $k^2$, and the lower ends of the stems of the keys are provided with felt-covered leather buttons $k^3$, which are screwed higher or lower on the lower threaded ends of the stems $k'$ of the keys, so as to be adjusted properly thereon relatively to the keys of the piano to be struck thereby. To the under side of the yielding keyboard is attached a longitudinal felt-cushioned rail $r$, so as to render the contact between the keyboard and top of the sounding-board noiseless.

At the right-hand end of the sounding-board A and adjacent the end of the yielding keyboard is arranged a piano-action, which consists of a spring-actuated hammer $h'$, which is is pivoted to a slide-piece $h^2$, said hammer being acted upon by a suitable spring $h^3$, so as to be held in inclined position against a stationary stirrup $s$. The slide-piece $h^2$ is guided in suitable ways $h^4$ on the sounding-board and moved backward or forward by a fulcrumed lever $l$, which engages the slide-piece, said lever being guided over a stationary rail $r'$, attached to the sounding-board. When it is desired to sound a string, the slide-piece $h^2$ is moved in forward direction by the lever $l$, in which position the hammer is located above the string. At the right-hand end of the yielding keyboard E is attached an arm $l'$, provided with a felt covering, which engages a pivoted roller $r^2$ in the hammer-butt $h^5$, said roller being preferably made of leather, so as to take up the contact of the felt-covered arm $l'$ when the keyboard is lowered and impart thereby an oscillating motion to the hammer, so that the same strikes the string. A stationary catch $s'$, attached to the right-hand end of the sounding-board, serves to limit the upward movement of the keyboard E. The keys $k$ are arranged in the keyboard in two rows corresponding to the white and black keys of an octave of a piano or other instrument in relative position, so that by depressing the "A" key of the tuner the key A of the piano will be depressed. The stems of the rear row of keys are somewhat shorter than those of the front row, so as to provide for the height of the black keys above the white ones, as shown clearly in Fig. 5. The scale $i'$ is provided at its graduations with designations that correspond to the keys $k$ of the keyboard E.

My improved tuning instrument is used as follows: The string C is first tuned to the desired pitch. The device is then placed in position on the keyboard of the piano, at the treble end thereof, as the string C corresponds to a treble string of a piano. The keys of the tuning device are disposed over corresponding keys of the piano. A string of the piano is then selected that is of the octave which is within the control of the tuning device and is tuned to sound in unison with the string of the device that is suitably fitted to correspond with the selected string of the piano, and the other strings of the octave are tuned to sound in unison with their respective keys of the tuning device, so that the corresponding strings of the piano constitute an exact temperament to that of the tuning device. The tuning is accomplished by setting the sliding stop to the desired graduations of the scale and striking the corresponding key with one hand and operating the tuning-key of the corresponding string in the piano until the piano-string is tuned in unison with the string of the tuning device. The sliding stop is adjusted along the scale so that the string C serves for the tuning of an entire octave. The remaining strings of the piano are then tuned in the usual manner in harmony with the strings of the octave tuned by means of the tuning device.

In tuning up the companion strings it is not necessary to sound the string of the tuning device, and the sliding portion of the hammer is taken away from the string, which in this case would only actuate the key already tuned, so that its companion key can be tuned in unison therewith.

The tuning device is intended to be used not only by professional piano-tuners, but also in factories, as it furnishes a mathematically-correct mechanism for laying an equal temperament on keyed or stringed instruments. It facilitates tuning of pianos and furnishes an easy method of learning the tuning of the same. It saves considerable time in tuning pianos in factories and produces uniformity in tuning. It has the advantage that it can be tuned to any desired pitch for which the pianos are to be tuned, and, lastly, it can be easily carried in a suitable box for doing outside work.

Many modifications of the details of my improved device will doubtless readily suggest themselves to those skilled in the art to which it appertains, and I therefore do not desire to limit my invention to the specific construction herein shown and described.

Having thus described my invention, I claim as new and desire to secure by Letters Patent—

1. The combination, with a suitable frame-body adjustable along the keyboard of a musical instrument, of a single mechanism for producing a musical tone and simultaneously depressing the corresponding key in said keyboard, and means for varying the pitch of said tone.

2. The combination, with a suitable frame adjustable along the keyboard of a musical instrument, of means for depressing any predetermined key within a limited range thereof, a single simultaneously-operated tone-producing mechanism, and means for varying within corresponding limits the pitch of the tone produced.

3. The combination, with a suitable frame adjustable along the keyboard of a musical instrument, of a single independent mechanism for producing a musical tone, and means for varying and accurately determining the pitch of said tone, the tone-producing means operating to depress a predetermined and corresponding key in said keyboard.

4. The combination, with a suitable frame, of a single mechanism for producing any predetermined musical tone within a limited range thereof, and means for depressing any predetermined key, within corresponding limits, of the keyboard of a musical instrument, both of said means being codependent whereby the former is actuated automatically by and simultaneously with operation of the latter.

5. The combination, with a sounding-board and a single string in tension in proximity thereto, of means for depressing any predetermined key in the keyboard of a musical instrument and simultaneously vibrating said string.

6. The combination, with a sounding-board, a single string in tension in proximity thereto, and means for fretting said string, of means for depressing any predetermined key in the keyboard of a musical instrument and simultaneously vibrating said string.

7. The combination, with a sounding-board, a string in tension in proximity thereto, and means for varying both the tension and the vibrating length of said string, of means for depressing a predetermined key in the keyboard of a musical instrument and simultaneously causing vibration of said string.

8. The combination, with a sounding-board, a string mounted thereupon, means for varying the tension of said string, and means for fretting said string, of means for depressing any predetermined key in the keyboard of a musical instrument and simultaneously striking said string.

9. The combination, with a suitable frame, of a yielding keyboard provided with a plurality of keys for actuating the keys of a musical instrument in operative proximity thereto, means for producing a musical tone, and means for varying the pitch of said tone, said yielding keyboard being provided with means for actuating said tone-producing means.

10. The combination, with a suitable frame, of a yielding keyboard provided with a plurality of keys for actuating the keys of a musical instrument in operative proximity thereto, a sounding-board, a string in tension adjacent thereto, means for fretting said string at predetermined points, and means for vibrating said string, said yielding keyboard being provided with means for actuating said string-vibrating means.

11. The combination, with a suitable frame, of a yielding keyboard provided with a plurality of keys each adapted to depress its corresponding key in the keyboard of a musical instrument thereunder, said yielding keyboard being actuated by depression of any one key therein independently of the remaining keys, means for producing a musical tone, and means for varying the pitch of said tone, said yielding keyboard being provided with means for actuating said tone-producing means.

12. The combination, with a suitable frame, of a yielding keyboard provided with a plurality of keys each adapted to depress its corresponding key in the keyboard of a musical instrument thereunder, said yielding keyboard being actuated by depression of any one key therein independently of the remaining keys, a sounding-board, a string in tension adjacent thereto, means for fretting said string at predetermined points, and means for vibrating said string, said yielding keyboard being provided with means for actuating said string-vibrating means.

In testimony of the foregoing I have hereunto set my hand in the presence of two witnesses.

ALOYS BRAMBACH.

Witnesses:
STEPHEN BRAMBACH,
ALPHONSE HEINRICH.